Patented Aug. 5, 1924.

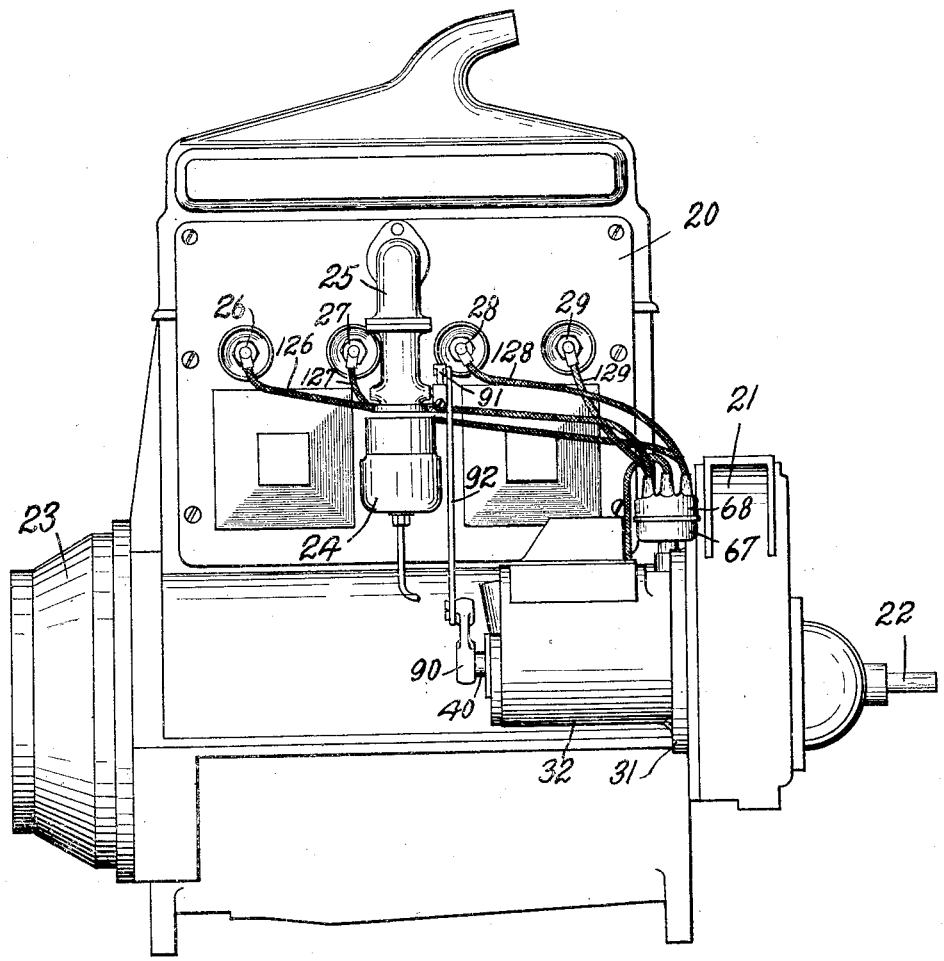

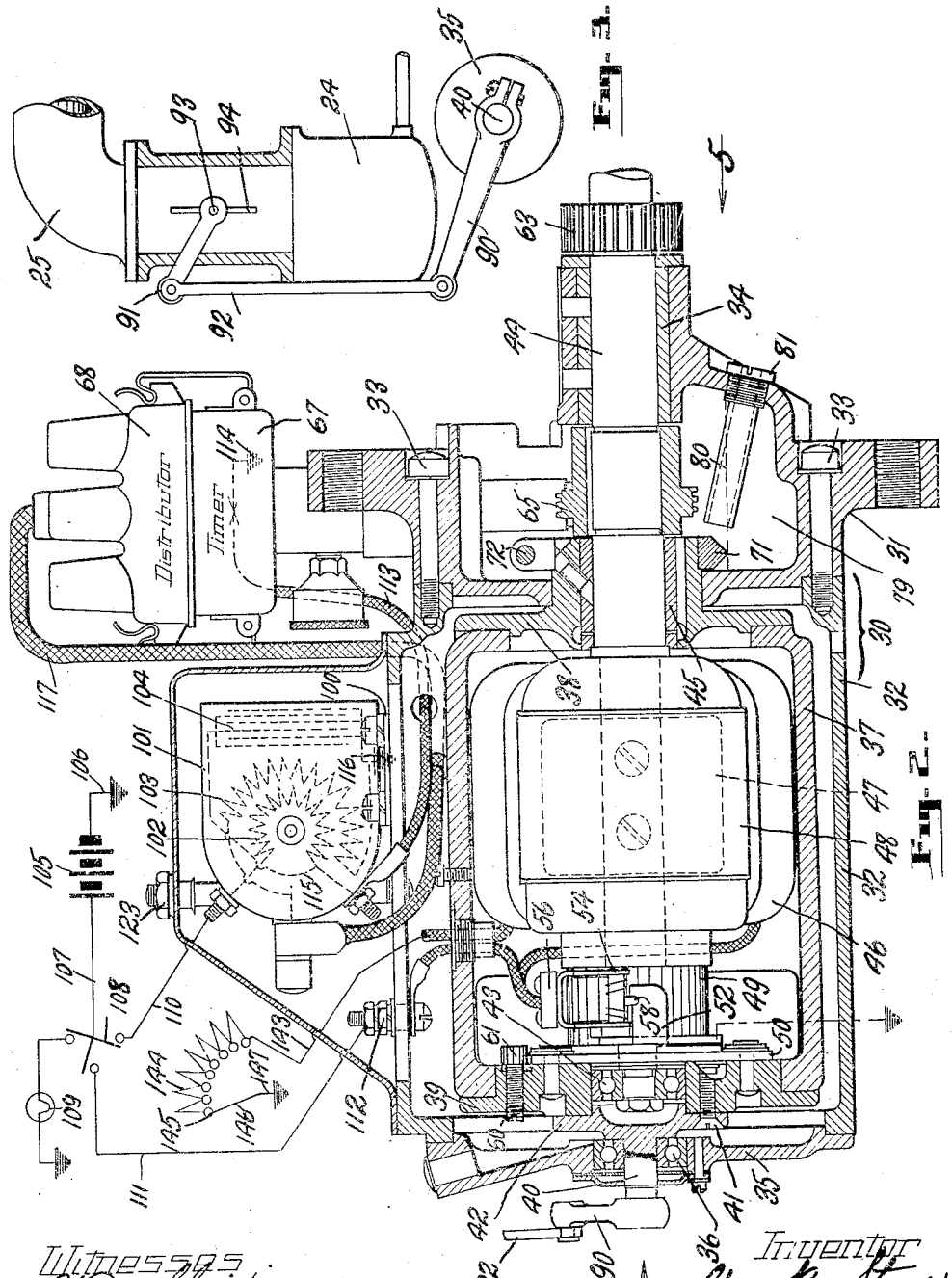

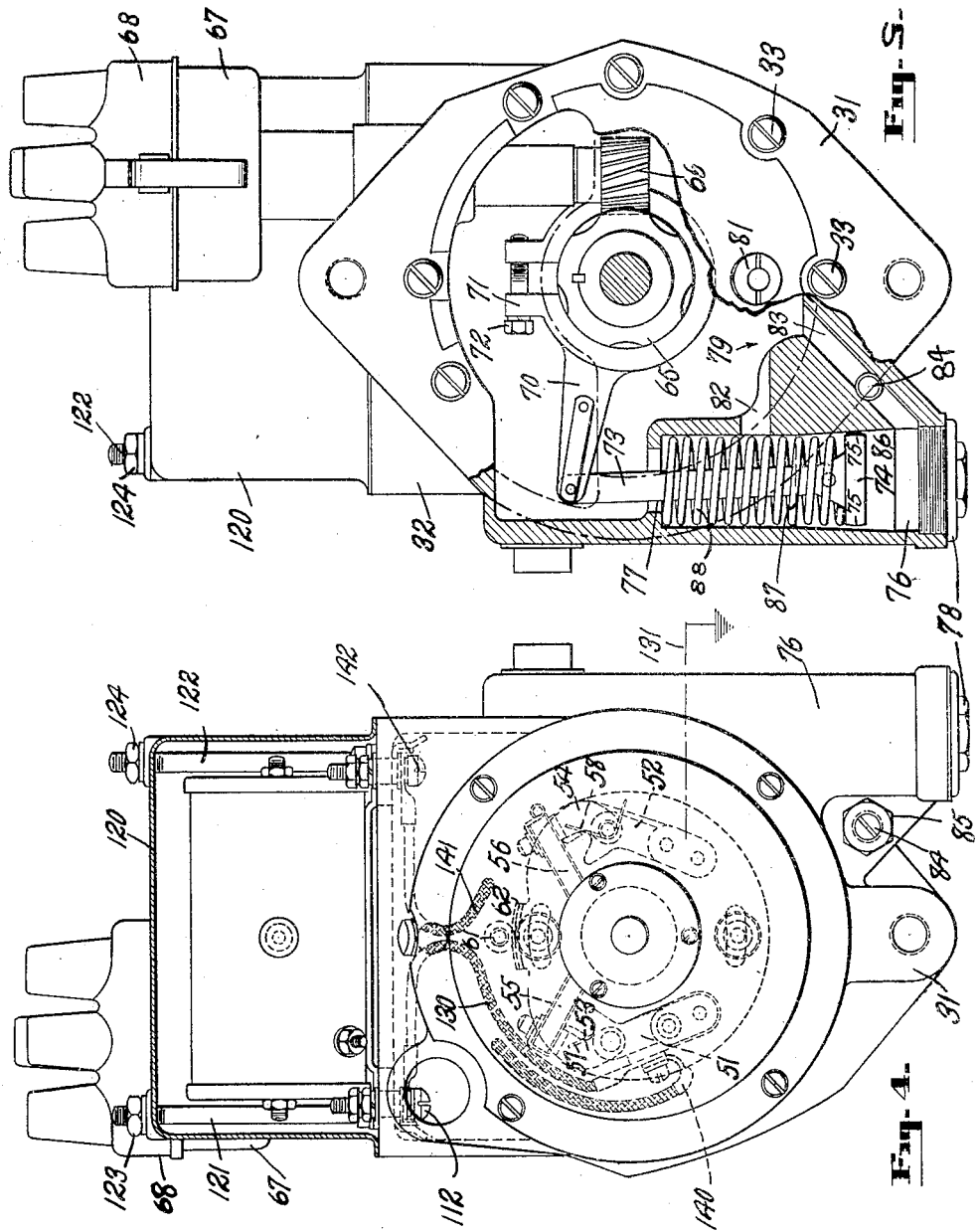

1,504,161

UNITED STATES PATENT OFFICE.

GUY B. STONE, OF CHICAGO, ILLINOIS.

GOVERNING DEVICE.

Application filed March 17, 1919. Serial No. 283,109.

*To all whom it may concern:*

Be it known that I, GUY B. STONE, a citizen of the United States of America, residing at Chicago, county of Cook, State of Illinois, have invented certain new and useful Improvements in Governing Devices, of which the following is a full, clear, and exact description.

This invention relates to governing devices for engines, and particularly for variable speed engines used on self-propelled vehicles.

One object of the invention is to provide an engine governor which can be used with throttle valves which are commonly employed so that specially constructed throttle valves are unnecessary.

To carry out this object I employ certain features of my invention disclosed in my Patent No. 1,362,546, dated December 14, 1920.

In the patent referred to, a generator which is driven by the automobile engine to furnish current for lighting, ignition and battery charging purposes, is so constructed and arranged that certain of its generating elements, besides cooperating to produce an electric current, serve to control the throttle valve of the engine. In this connection it is an object of this invention to provide a governor generator of improved construction having provisions whereby attachment to the engine frame, the driving connection with the engine, and the controlling connection with the engine throttle valve can be effected in a simple and efficient manner.

A further object of the invention is to provide a governor in which hunting between the operations of the engine and governor is eliminated.

A further object of the invention is to provide a unitary structure comprising the governor generator and ignition devices which are used to furnish ignition for the engine.

Other and further objects of the present invention will be apparent from the following description, reference being had to the accompanying drawings, wherein preferred embodiments of the present invention are clearly shown.

In the drawings:

Fig. 1 is a side elevation of the engine equipped with the electrical unit embodying the features of the present invention;

Fig. 2 is a longitudinal sectional view of the electrical unit shown in Fig. 1 together with a wiring diagram showing the electrical connections with the battery and circuit controlling devices;

Fig. 3 is an end view of certain parts shown in Fig. 2 looking in the direction of the arrow 3 in Fig. 2, and illustrating the connection of the governor generator with the carburetor of the engine;

Fig. 4 is an end view looking in the direction of the arrow 3 in Fig. 2 certain parts being omitted and certain other parts being shown in section for the sake of clearness; and Fig. 5 is an end view looking in the direction of the arrow 5 in Fig. 2 certain parts being shown in section.

Referring to the drawings, 20 designates as a whole an internal-combustion engine provided with a frame 21 upon which the cylinders are mounted. The crank shaft is shown at 22, and the flywheel at 23. Fuel is supplied to the engine from the carburetor 24 through the intake pipe 25. The spark plugs of the engine are shown at 26, 27, 28 and 29.

30 designates as a whole the frame of a governor generator comprising a bracket 31 which is adapted to be mounted upon the engine frame 21, and a housing 32 which is secured to the bracket 31 by means of the bolts 33. The bracket 31 is provided with a bearing 34, and the housing 32 with an end plate 35 which supports a bearing 36. To a generator field shell 37 are secured end plates 38 and 39. A stub shaft 40 is fastened to the end plate 39 in any suitable manner as by means of screws 41 which pass through a flange 42 formed integrally with the shaft 40. This shaft 40 is journalled in the bearing 36. The end plate 39 supports a bearing 43, and within this bearing 43 and the bearing 34 is journalled an armature shaft 44. The end plate 38 supports a bearing 45 by means of which said plate 38 is journalled upon the armature shaft 44.

The field shell 37 supports the field windings and pole pieces, one of the field windings being shown at 46, and one of the pole pieces being shown at 47. The shaft carries the armature 48 and the commutator 49.

Upon the end plate 39 there is mounted in concentric relation to the shaft 44 a brush plate 50. Brush holder brackets 51 and 52 are mounted upon the plate 50, and support the brush holders 53 and 54, respectively, which carry brushes 55 and 56, respectively. Springs 57 and 58 yieldingly maintain the brushes 55 and 56 in contact with the commutator 49. Adjustment of the brush plate 50 is effected by turning a screw 60 which is provided with a pinion 61 meshing with a segmental gear 62 formed on the plate 50.

Rotation is imparted to the armature shaft 44 through the gear 63 fixed thereon which meshes with the gearing contained within the frame 21 which is not shown, but by means of which motion is imparted from the crank shaft 22 to the gear 63.

A gear 65 mounted in fixed relation to the shaft 44 meshes with the gear 66 and thereby effects a driving connection between the shaft 44 and the timer cam, not shown. This cam serves to operate in predetermined relation with the engine certain elements of the timer 67 and the distributor 68 so as to furnish suitable ignition for the engine. As the particular structure of the timer and the distributor do not form a part of the present invention, further illustration and description thereof is omitted.

In order to control the rotative tendency of the field shell 37 there is provided an arm 70 formed integrally with a split hub 71 secured to the end plate 38 by means of a clamping screw 72. Arm 70 cooperates with rod 73 which carries at one end dash pot piston 74 having a spherical lateral surface 75 in order to provide a constant piston clearance with variations in angular movement of the piston. The bracket 31 is formed so as to provide for the reception of the piston 75 and dash pot cylinder 76 which is open at the top by means of aperture 77, and closed at the bottom by means of plug 78.

Bracket 31 is also formed so as to provide an oil chamber 79 which can be filled with oil to the level indicated by the line 80 (Fig. 3), from whence oil may flow out through overflow tube 81. Tube 81 has screw threaded engagement with the bracket 31, by turning tube 81 the level 80 may be raised or lowered if desired.

Passages 82 and 83 connect the cylinder 76 with the oil chamber 79, and screw 84 having screw threaded engagement with the bracket 31 is arranged so that one end thereof projects into the passage 83. By turning the screw 84 the flow of oil through this passage 83 can be regulated. A nut 85 locks the screw 84 in adjusted position.

Below the line 86 the bore of the cylinder 76 is uniform down to the threads which engage with the plug 78. From the line 86 to the line 87 the cylinder 76 has a tapered bore, and above the line 78 the bore of the cylinder 76 is again uniform but of a smaller diameter than that below the line 86. The purpose of this tapered portion will be described later. A spring 88 is interposed between the upper end wall of the cylinder 76 and the piston 74.

The outer end of the stub shaft 40 carries an arm 90 which is connected with the throttle level arm 91 by means of a link 92. Arm 91 is mounted upon a shaft 93 which is mounted upon the carburetor 24 and carries a butterfly valve 94 located within the fuel passage of the carburetor.

Upon the housing 32 is mounted a coil bracket 100 which supports the ignition coil casing 101 which includes the usual primary and secondary windings 102 and 103 and the condenser 104 which are shown diagramatically in Fig. 2.

Referring to the wiring diagram shown in Fig. 2, 105 indicates a storage battery grounded at 106 and connected by means of wire 107 with the movable switch contact 108 by means of which the battery may be connected with the lamp 109, with wire 110 leading to the primary winding 102, and with the wire 111 leading to the generator terminal 112. The other end of the primary winding 102 is connected by means of conductor 113 with the timer 67 which is grounded at 114. The condenser 104 is connected in parallel with the timer contacts by means of wires 115 and 113 and by means of the ground connection indicated at 116. The secondary winding 103 is also grounded at 116 and the other end thereof is connected by means of cable 117 with the distributor which distributes through cables 126, 127, 128 and 129 and the spark plugs 26, 27, 28 and 29 respectively.

The housing 32 is provided with a cover 120 which incloses the ignition coil casing 101 and certain of the connections made between the generator and the other parts of the electrical apparatus. This cover 120 is held in position by means of nuts 123 and 124 which cooperate with the studs 121 and 122 secured to the housing 32.

The charging circuit includes the battery 105, wires 107 and 111, generator terminal 112 and the conductor 130 which is connected with the brush 55. The other brush 56 is grounded as indicated by the connection 131. This ground connection is usually the frame of the generator, the engine frame and the automobile side frame upon which the battery 105 is grounded as at 106.

The shunt field circuit of the governor generator includes brush 55, conductor 140 which leads into the field coils 46, and conductor 141 connected with terminal 142. Terminal 142 is connected by wire 143 with resistance windings 144 which are connected with buttons 145. Arm 146 contacts with buttons 145, and is grounded at 147. The shunt filed circuit continues by ground connections 147 and 131 and to the other brush 56.

The operation of my invention is as follows:

After the engine has become self-operative and the generator is delivering current, the field shell 37 will tend to rotate, due to magnetic attraction, in the some direction as the rotating armature which is clockwise, as viewed in Fig. 5, and counter clockwise, as viewed in Figs. 3 and 4. This movement is resisted by spring 88. Spring 88 is constructed so that when a predetermined engine speed has been reached and a predetermined amount of current has been generated, the following torque of the field will overcome the torque produced by spring 88 and will cause the arm 90 to move the valve 94 toward closed position. The speed of the engine will then decrease, causing the current in the generator to decrease, whereupon spring 88 will tend to open the throttle again. A balance will be established between the following torque of the field and the torque produced by spring 88 such that the speed of the engine will be limited to a predetermined maximum value.

The function of the dash pot will now be described. Dash pot 76 is kept filled with oil from the oil chamber 79 to a level depending on the location of the upper end of the overflow tube 81. It will be observed that on account of the tapered wall of the dash pot the oil will have a variable damping effect on the movements of the piston 74 depending on its position in the dash pot, that is, when piston 74 is near the level 87 this damping effect will be greater than when piston 74 is at the level 86. When piston 74 is near the upper level, the throttle 94 is nearly closed and the engine speed being maintained at the predetermined maximum value. When in this position, the pressure on throttle 94 due to the suction of the engine is greatest, hence the friction on the throttle bearings to be overcome in moving the throttle is greatest. It requires a considerable amount of energy to overcome this friction and therefore it is necessary for the engine to drop below governed speed an abnormal amount before there will be enough difference in the torque produced by spring 88 and the decreased following torque of the field to overcome this friction. As the throttle valve is opened, the vacuum above the valve drops off very fast, therefore, when the governor does start to open the valve, there is a tendency for the valve to be opened too wide, and consequently overspeeding the engine.

Therefore the dash pot is constructed so that its retarding effect will be most pronounced when there is the greatest liability for the governor to give an excessive opening movement to the throttle, this is, when the throttle is in the nearly closed position.

After the throttle has opened slightly the suction on the throttle valve and the resultant load on the throttle shaft bearings drops off, this tendency of the governor to overthrow the valve is reduced. Hence the retarding of the dash pot can be reduced in order that the governor will quickly respond to slight variations in load. Therefore as the opening of the valve increases the retarding effect of the dash pot diminishes.

The dash pot possesses an additional advantage in that it prevents the throttle valve from being slammed shut when load on the engine is reduced. When the governor is suddenly caused to actuate the throttle valve from wide open to closed position, a partial vacuum is created below the dash pot piston which prevents the governor from closing the throttle too far, and also assists in starting the reverse movement of the throttle toward full open position to meet a drop in engine speed.

The functions of the dash pot can be regulated by adjusting the screw valve 84 by means of which the flow of oil through passage 84 may be varied. Therefore it is apparent that a governor constructed in accordance with the present invention provides against hunting on the one hand, and, on the other is quickly responsive to variations in engine load.

While the form of mechanism herein shown and described constitutes a preferred form of embodiment of the invention, it is to be understood that other forms might be adopted, all coming within the scope of the claims which follow.

1. In an engine governor, the combination with means actuated by the engine for moving an engine throttle valve; of means for retarding the movement of said throttle moving means by a retarding action varying with the degree of opening of the valve.

2. In an engine governor, the combination with an electro-magnetic means for moving an engine throttle valve in response to the operation of the engine; of means for retarding the movement of the electromagnetic means by a retarding action varying with the degree of opening of the valve.

3. An electro-magnetic engine governor comprising, in combination, a rotor adapted to be driven by the engine, a movable member inductively related to the rotor and adapted to move a throttle valve, means for opposing the movement of the throttle valve by said member, and means for variably retarding the movement of said movable member as the valve is moved from open to closed position.

4. An electro-magnetic engine governor comprising, in combination, a rotor adapted to be driven by the engine, a movable member inductively related to said rotor and adapted to move a throttle valve to closed position, means tending to open the valve, and means for variably retarding the movement of the movable member, the retarding action increasing with the proximity of the valve to closed position.

5. An electro-magnetic engine governor comprising a rotor adapted to be driven by the engine, a rotatable member inductively related to said rotor and adapted to move a throttle valve to closing position, resilient means opposing the movement of the valve by the rotatable member, and means for retarding the action of the rotatable member by a retarding action varying with the degree of opening of the valve.

6. In an engine governor, the combination with a frame comprising a mounting bracket and a housing; a bearing carried by the bracket; a bearing carried by the housing; a generator armature shaft journalled upon the bracket bearing; a generator field shell journalled upon the housing bearing and upon the armature shaft and supporting a bearing upon which the armature shaft is journalled; a generator armature on the armature shaft; generator field windings supported by the field shell; a member actuated by the field member and adapted to control an engine throttle; and means carried by the bracket and arranged to resist the movement of the field member.

7. In an engine governor, the combination with a frame; of a generator armature shaft journalled on the frame; a generator field member journalled upon the frame and upon the armature shaft, and supporting a bearing upon which the armature shaft is journalled; a generator armature carried by said armature shaft; generator field windings carried by the field member; a member actuated by the field member and adapted to control an engine throttle; and means carried by the frame and arranged to resist the movement of the field member.

8. In an engine governor having electrical generating elements movable the one relatively to the other to produce an electric current, the combination with means including one of said elements actuated in accordance with the changes in generating speed and adapted to control an engine throttle; of a device for exerting a variable retarding effect upon the movements of said means depending on the position of said throttle.

9. In an engine governor having electrical generating elements movable the one relatively to the other to produce an electric current, the combination with means including one of said elements actuated in accordance with changes in generating speed and adapted to control an engine throttle; of a device for exerting a relatively small retarding effect upon the movements of said means when said throttle is open and a relatively greater retarding effect when said throttle is nearly closed.

10. In an engine governor, a generator adapted to be driven by the engine and to be connected to the engine throttle, and comprising a base; a rotor supported thereby; a field rotatably mounted on said base; an oil sump supported by said base; and a dash pot communicating with the oil sump and having a piston connected to said field.

11. A generator comprising in combination a base having a cavity adapted to receive oil; a movable rotor and field supported by said base; a dash pot cylinder in said base in communication with said cavity; and a piston in said cylinder connected to said movable field.

12. A generator base comprising in combination, means for attaching the generator to an engine and to a generator housing; a bearing for a generator shaft; an oil sump and a tapered dash pot cylinder formed in the base, the base having a passageway connecting the cylinder and oil sump; and means for controlling the flow of oil through said passageway.

13. In an engine governor, a generator adapted to be driven by the engine and to be connected to the engine throttle and comprising a base; a generator housing attached to one side of said base; a field having one end rotatably mounted on said housing; and a rotor rotatably mounted within said field.

14. In a governor for an internal combustion engine, a base adapted to be fastened to the engine; a generator housing attached to one side of said base; a generator field having one end rotatably mounted on said housing and having a shaft projecting through said housing; means on the outer end of said shaft for operating a throttle valve; and a rotor mounted in the field and having a rotor driving shaft projecting through said housing in the opposite direction from said field shaft.

15. A generator comprising in combination a base; a generator housing projecting from one side of the base; a bearing in the opposite end of said housing from the base; a movable field journalled in said bearing and in said base and having a shaft projecting through said bearing to the outside of the housing; an armature journalled in said field and base and having a driving shaft coaxial with said field shaft and extending through said base; and means on the outer end of said armature shaft for driving the latter.

16. In an electrical apparatus, an ignition device comprising a base; a generator housing supported by said base; a generator field in said housing having one end rotatably mounted thereon; an ignition coil, distributor and timer supported by said base; a field shaft projecting through one end of the housing and having connections for operating a throttle valve; a rotor mounted in said field; means including a shaft for rotating the rotor; and means connected to said shaft for operating the timer and distributor, whereby the current generated inductively actuates the field to control the throttle and supplies current to the ignition coil, timer and distributor.

In testimony whereof I affix my signature.

GUY B. STONE.

Witnesses:
CLARENCE K. SENCEBAUGH.
F. J. HARDMAN.